(12) United States Patent
Vandegrift et al.

(10) Patent No.: US 8,979,072 B2
(45) Date of Patent: Mar. 17, 2015

(54) MAST SAFETY RESTRAINT MECHANISM

(75) Inventors: Darrell K. Vandegrift, Wooster, OH (US); James S. Arnold, Canal Fulton, OH (US)

(73) Assignee: The Will-Burt Company, Orrville, OH (US)

( * ) Notice: Subject to any disclaimer, the term of this patent is extended or adjusted under 35 U.S.C. 154(b) by 259 days.

(21) Appl. No.: 13/455,512

(22) Filed: Apr. 25, 2012

(65) Prior Publication Data

US 2013/0284864 A1 Oct. 31, 2013

(51) Int. Cl.
| | | |
|---|---|---|
| *B66F 1/00* | (2006.01) | |
| *B66F 3/00* | (2006.01) | |
| *E04H 12/20* | (2006.01) | |
| *F16M 11/26* | (2006.01) | |
| *F21V 21/06* | (2006.01) | |
| *H01Q 1/12* | (2006.01) | |

(52) U.S. Cl.
CPC .................. *B66F 3/00* (2013.01); *E04H 12/20* (2013.01); *F16M 11/26* (2013.01); *F21V 21/06* (2013.01); *H01Q 1/1235* (2013.01); *H01Q 1/1242* (2013.01)
USPC .......................................... 254/387; 254/4 R

(58) Field of Classification Search
USPC ....... 248/125.2; 254/387, 389, 390, 391, 4 R; 188/67; 414/10
See application file for complete search history.

(56) References Cited

U.S. PATENT DOCUMENTS

| | | | | |
|---|---|---|---|---|
| 2,983,474 A | * | 5/1961 | Hanna | 248/161 |
| 3,332,187 A | * | 7/1967 | Arcari | 52/309.12 |
| 3,861,647 A | * | 1/1975 | Meredith | 254/4 R |
| 3,891,184 A | * | 6/1975 | Fields | 254/4 R |
| 4,508,316 A | * | 4/1985 | Millard | 254/4 R |
| 6,640,934 B1 | | 11/2003 | Edwards | |
| 7,708,250 B1 | * | 5/2010 | Dein | 248/354.1 |
| 2007/0014116 A1 | | 1/2007 | Yoshimori et al. | |

FOREIGN PATENT DOCUMENTS

| | | |
|---|---|---|
| JP | 10-144109 | 5/1998 |
| JP | 11-171308 | 7/1999 |

OTHER PUBLICATIONS

International Search Report dated Jun. 21, 2013.

* cited by examiner

*Primary Examiner* — Todd M Epps
(74) *Attorney, Agent, or Firm* — Fay Sharpe LLP

(57) ABSTRACT

Described herein is a safety restraint mechanism for a mast assembly. The safety restraint mechanism comprises a tension line attached to a lever and a winch mechanism such that operation of the winch mechanism translates a carriage assembly along the mast. A cam brake including an engagement profile at a first end thereon is pivotally attached to the lever at a second end. The cam brake is also pivotally attached to the carriage assembly such that the engagement profile pivots into a brake position or a free lift position relative to a tension force acting on the lever. The lever is pivotally attached to the second end and includes a kickstand. The engagement profile having a protruded portion to abut the tubes in a brake position and a relief portion to space the cam brake from the tubes in a free lift position.

11 Claims, 6 Drawing Sheets

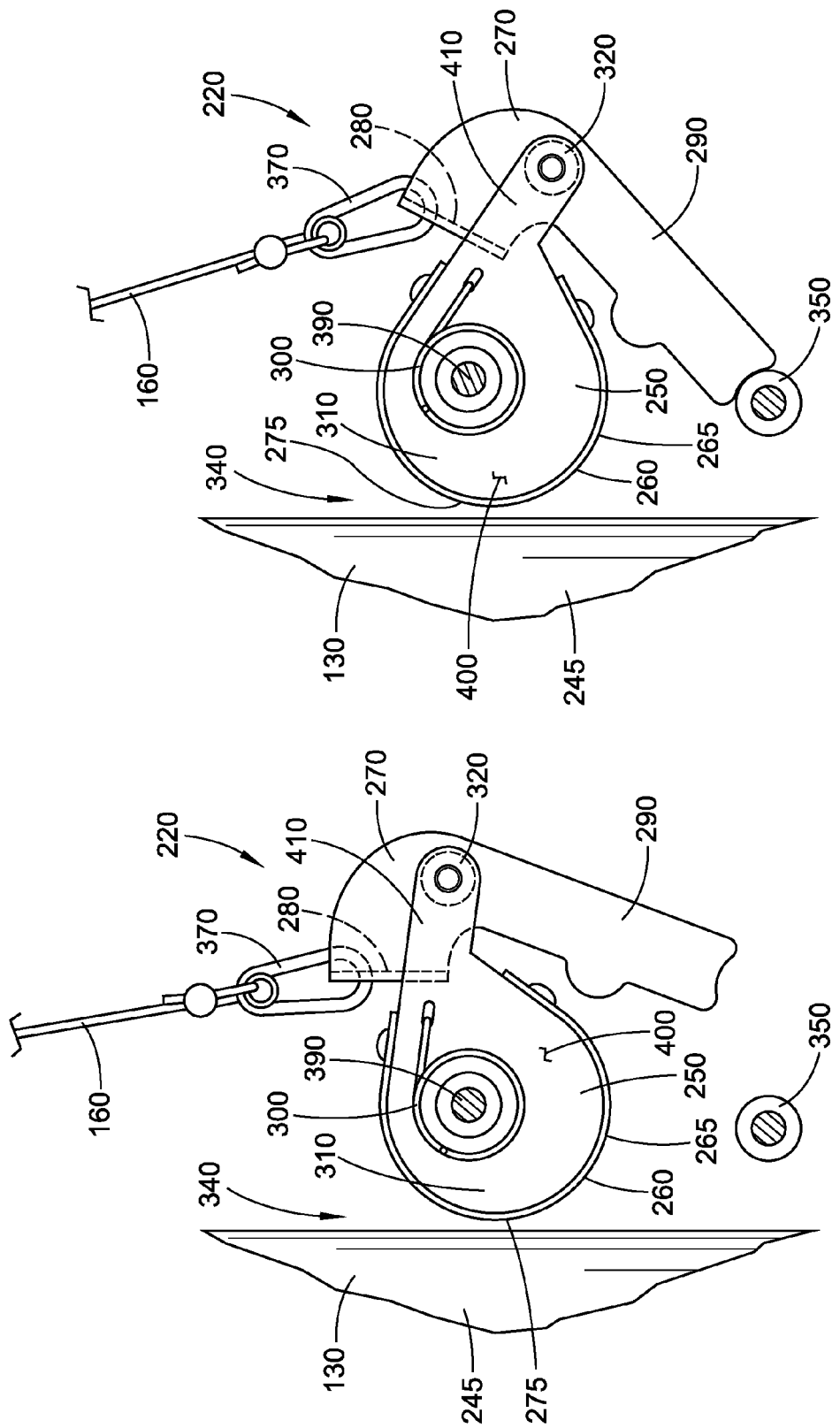

MAST SAFETY RESTRAINT MECHANISM

BACKGROUND

The present exemplary embodiment relates to a mast safety restraint mechanism. It finds particular application in conjunction with a cable winch operated portably mast assembly, and it will be described with particular reference thereto. However, it is to be appreciated that the present exemplary embodiment is also amenable to other like applications.

Portable masts systems are utilized in many different capacities, including civilian, industrial and military applications, throughout the world. Quick erecting and portable masts are particularly suited for applications wherever there is a need for masts requiring fast setup and teardowns with minimum manpower and effort. In addition to numerous military applications, including target acquisitions, surveillance and field communications, quick and portable erecting masts are utilized commercially to support a variety of payload types such as antennas, satellite dishes, elevated testing equipment, floodlights and cameras. Free standing masts can be installed on a wide variety of terrain but can also be erected on vehicles and shelters.

Generally, the body of the mast includes a series of stackable tubes that typically comprise cylindrical shaped bodies, each tube having a generally hollow interior configured to be breech loaded. Breech loading typically includes stacking each tube from the base such that each additional tube added to the mast extends the height upwards. The plurality of stackable tubes is generally configured to be concentrically engaged to one another. This arrangement can comprise any number of tubes, wherein each tube includes a generally similar sized diameter, and is commonly known in the art. Portable masts are supported by a system of guy wires, base plates, stakes, and a support base. The plurality of tubes that comprises a portable mast assembly is manually breech loaded by a user to extend a top tube from the support base such as a tripod base to a desired height. The guy wires can be attached to the top tube of the mast assembly and are staked to the ground at positions surrounding the tripod base.

Portable masts can include carriage assemblies that are known to be manually or automatically operated using a cable winch arrangement. Particularly, a cable winch mast includes a winch mechanism positioned at a user level of the mast assembly for translating the carriage assembly to any position between a retracted position and an extended position. Cable winch masts are useful as field-erected masts due to their lightweight mobility and can be quickly erected relative to other mast systems.

The carriage assembly is used to translate a desired payload, such as lighting assemblies, communication antennae, satellite dishes, cameras or the like, from the support base to a desired elevation along the extended portable mast assembly. The carriage assembly is configured to move along the tubes of the mast while supporting the payload. Generally, the carriage is attached to a cable, which is wound around a pulley at the top tube and a spool of the winch mechanism located adjacent to the support base of the mast assembly. Rotation of the spool acts to retract the cable and lift the carriage and payload upwards along the erected mast tubes.

However, the cable is subject to various loads and therefore risks failure due to cable fray, breakage or becoming disconnected from a connection to the winch mechanism or carriage assembly. Upon cable failure, the carriage assembly and associated payload, if elevated at the time of cable failure, may crash down upon the support base or winch mechanism and cause damage or injury to surrounding people and property.

Therefore, there is a need to provide a carriage assembly that is capable of maintaining its elevation along the erected mast tubes in the event of cable failure. There is also a need to provide a mast safety restraint mechanism to limit the risk and scope of damage caused by cable failure.

BRIEF DESCRIPTION

In one embodiment, a safety restraint mechanism is provided for a mast assembly. The mast assembly comprising a carriage assembly adapted to support an associated payload and configured to translate axially along a plurality of elongated tubes. The safety restraint mechanism comprises a tension line attached to a lever at a first end and attached to a winch mechanism at a second end such that operation of the winch mechanism retracts or extends the carriage assembly along the mast. A cam brake including an engagement profile at a first end thereon is pivotally attached to the lever at a second end. The cam brake is also pivotally attached to the carriage assembly such that the engagement profile pivots into a brake position or a free lift position relative to a tension force acting on the lever.

Optionally, the safety restraint mechanism may further include a biasing member adapted to urge the cam brake towards the engaged position. Further, the lever of the safety restraint mechanism may include a kickstand member adapted to selectively engage the carriage assembly such that the cam brake and engagement profile are in the free position. In addition, the engagement profile may be adapted to pivot to the brake position as the tension force acting on the tension line is removed or it may be adapted to pivot to the free lift position as the tension force acting on the tension line is applied.

In another embodiment, provided is a safety restraint mechanism for a carriage assembly configured to move axially along a plurality of stackable tubes. The safety restraint mechanism includes a lever configured to be attached to a tension line. A cam brake is pivotally attached to the carriage assembly and includes a first end and an oppositely disposed second end. The first end having an engagement profile. The lever is pivotally attached to the second end and includes a kickstand. The engagement profile having a protruded portion configured to abut the plurality of stackable tubes of the mast assembly in a brake position and a relief portion configured to disengage the elongated tubes in a free lift position.

Optionally, the engagement profile of the safety restraint mechanism may be is non-linear and/or the protruded portion may be adjacent to the relief portion. Also, the lever may include a kickstand adapted to engage a portion of the carrier assembly to selectively place the cam brake in the free lift position or the brake position. Additionally, the safety restraint mechanism may further include a biasing member configured to engage the carriage assembly and the cam brake to urge the cam brake towards the brake position, wherein the biasing member may be a torsion spring.

In yet another embodiment, a method of safely restraining a carriage assembly configured to move axially along a mast assembly is provided. The method includes: erecting a mast assembly having a plurality of elongated tubes with a carriage assembly positioned thereon, the carriage assembly having a cam brake; positioning the cam brake in a free lift position such that the carriage assembly can translate along the plurality of elongated tubes; and biasing the cam brake to a brake position such that the cam brake engages at least one of the tubes and assists to prevent downward motion of the carriage assembly along the tubes.

BRIEF DESCRIPTION OF THE DRAWINGS

FIG. 4 is a fragmentary cross sectional view of the carriage assembly with the safety restraint mechanism in the free position in accordance with FIG. 1;

FIG. 5 is a fragmentary cross sectional view of the carriage assembly with a kickstand of the safety restraint mechanism in an engaged position in accordance with the present disclosure;

DETAILED DESCRIPTION

It is to be understood that the detailed figures are for purposes of illustrating exemplary embodiments only and are not intended to be limiting. Additionally, it will be appreciated that the drawings are not to scale and that portions of certain elements may be exaggerated for the purpose of clarity and ease of illustration.

In accordance with the present disclosure, a safety mechanism is provided for portable mast assembly having breech loaded tubes for elevating a payload. The safety mechanism is directed to prevent a mast carriage assembly and its associated payload from cascading downward in the event a cable line is damaged or tension is loosened. The mechanism is a safety restraint system for the payload elevation carriage such that the payload remains elevated in the event of cable failure.

Figure 1:
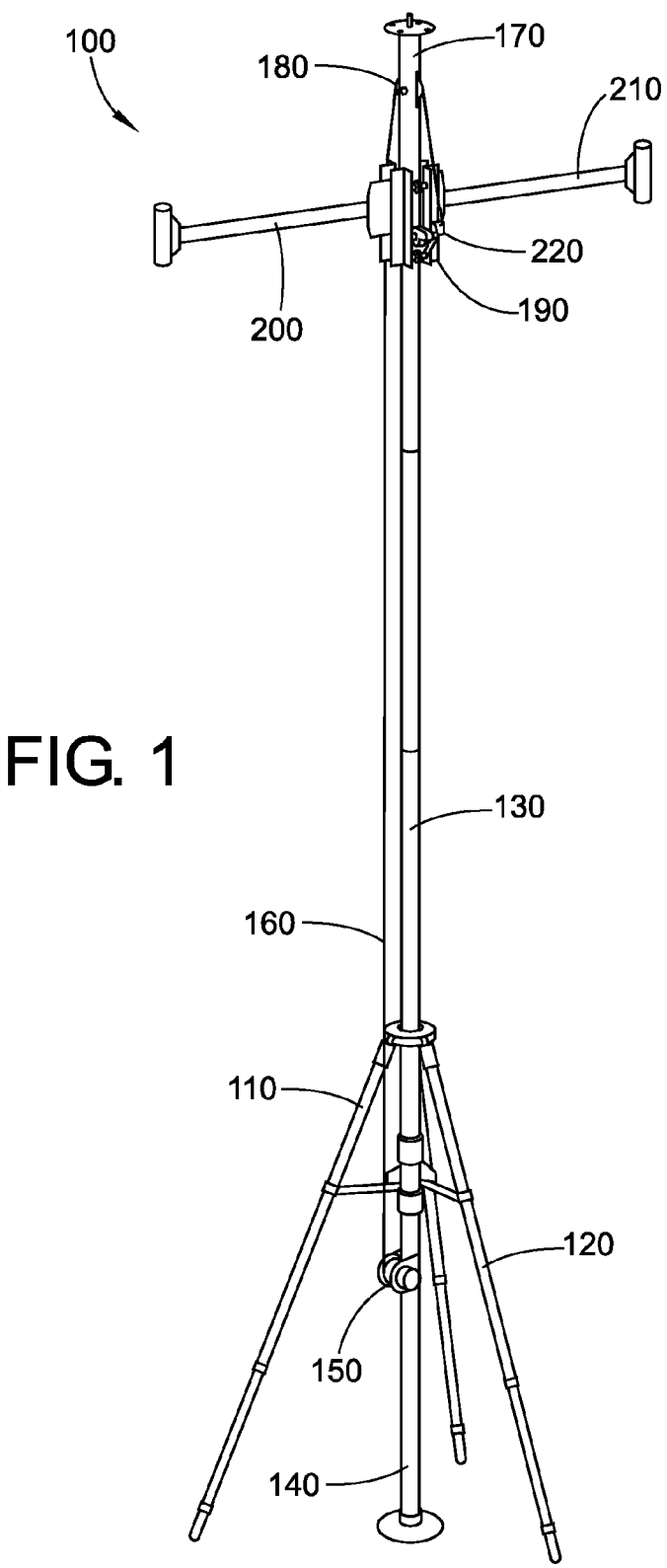
FIG. 1 is a perspective view of a mast assembly and a carriage assembly with a safety restraint mechanism in accordance with the present disclosure.
Figure 2:
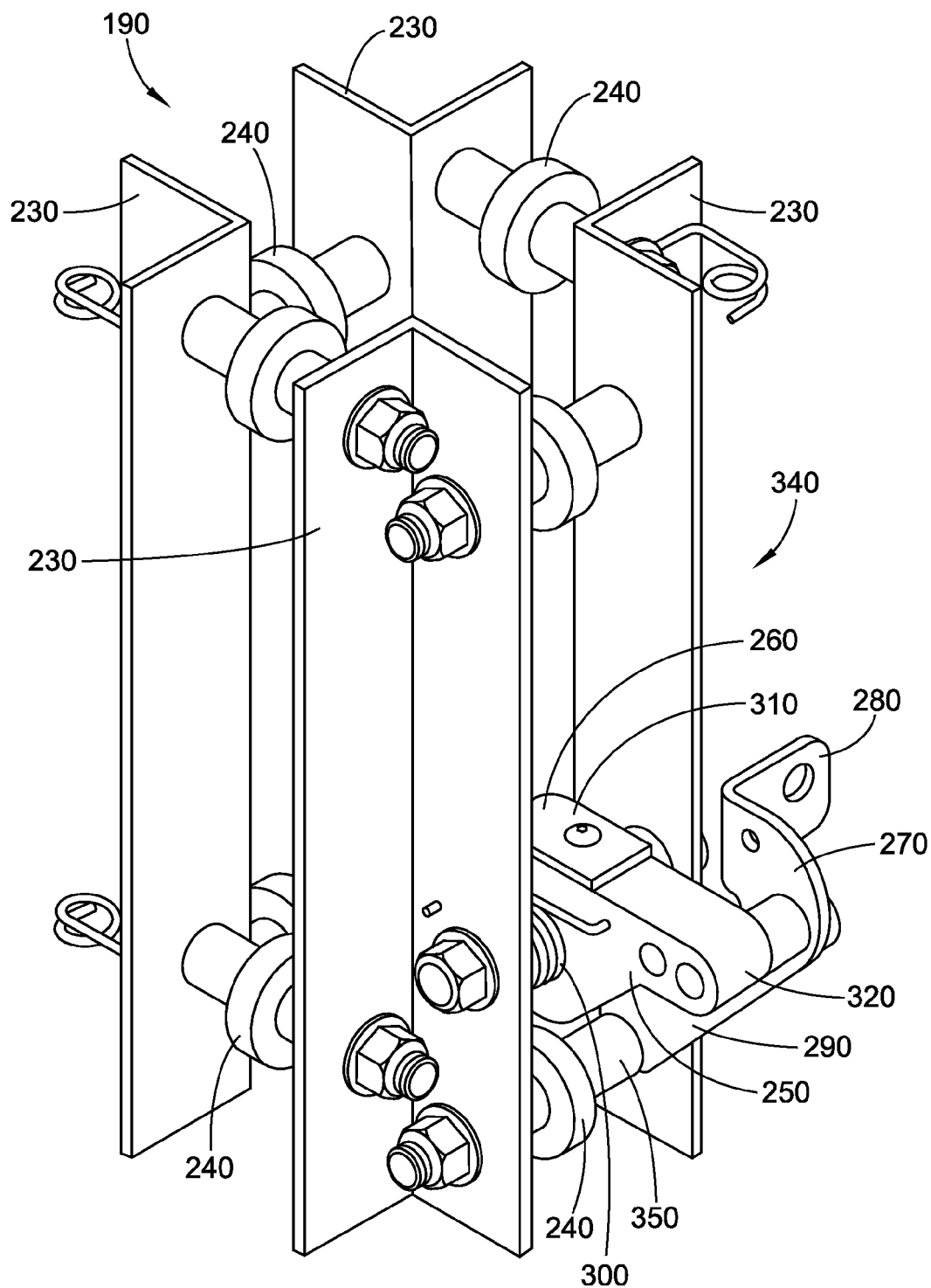
FIG. 2 is a perspective view of the carriage assembly with the safety restraint mechanism in accordance with FIG. 1.

With reference to FIG. 1, a portable mast 100 is illustrated in a deployed and elevated condition. The mast 100 is supported by a tripod base 110 and includes three legs 120 that can be operatively retractable and expandable. However, any number of legs 120 can be used and is not limited as such. A plurality of stackable tubes 130 are breech loaded through the base 110 to a desired height. It is preferred that each one of the tubes 130 have a generally cylindrical shape such that each tube is provided with a common diameter. However, the stackable tubes 130 could also have different shapes and are not limited as such. In one embodiment, the mast can be deployed to a height between 8 and 60 feet.

A base tube 140 is provided at the bottom of the plurality of stackable tubes 130 and includes a winch mechanism 150 for retracting and extending a tension line 160 wound thereon. Optionally, the winch mechanism 150 can be installed separate from the base tube 140 so long as it is accessible by a user to operate the winch 150 without obstruction from other features such as the tripod base 110. Additionally, a top tube 170 is provided at the top of the plurality of stackable tubes 130. The tension line 160 is routed from the winch mechanism 150 through an opening in the top tube 170 around a pulley 180 therein and attached to a carriage assembly 190 operably positioned along the plurality of tubes 130. In one embodiment, the winch mechanism 150 of the portable mast assembly 100 is manually operated but could also be provided with an automatic winch mechanism.

The carriage assembly 190 of FIG. 1 includes a first arm 200 and a second arm 210 for supporting a payload thereon. The first and second arms 200, 210 extend from the carriage assembly in a generally perpendicular manner from the plurality of stackable tubes 130. Additionally, various other configurations of the payload can be supported by the carriage assembly 190 as the first and second arms 200, 210 are interchangeable with other payload supporting structures. In one embodiment, the carriage assembly 190 is configured to support a payload of 40 pounds. It is to be understood, however, that other payloads are contemplated within the scope of the exemplary embodiment.

Notably, the carriage assembly 190 includes a safety restraint mechanism 220 that is configured to maintain the position of the carriage assembly if the tension line or winch mechanism were to break or otherwise fail.

With reference to FIGS. 2-5, the carriage assembly 190 may be arranged with four elongated angle members 230 spaced by a plurality of rollers 240 in a generally square configuration. The rollers 240 are configured to maintain the elongated angle members 230 in a vertical configuration as they slidably interact with an outer surface 245 of the plurality of stackable tubes 130. Additionally, the elongated angle members 230 may be provided with a plurality of mounting holes 235 to interchangeably support a payload thereon.

A cam brake 250 is provided along one side of the carriage assembly 190 and is positioned between two of the angle members 230. The cam brake 250 includes a first end 310 and an oppositely disposed second end 320. The cam brake 250 is pivotally attached to the carriage assembly 190 adjacent the first end 310 such that an engagement profile 260 on the first end 310 of the cam brake 250 can pivot against the plurality of stackable tubes 130 in a brake position 330 (FIGS. 4 and 7) or can pivot away from the plurality of stackable tubes 130 in a free position 340 (FIGS. 2, 3, 5 and 6). The engagement profile 260 has a protruded portion configured to abut the plurality of stackable tubes 130 in the brake position and a relief portion configured to space the cam brake 250 from the tubes 130 in the free lift position.

A biasing member 300 is provided adjacent to the cam brake 250 to continuously urge the cam brake 250 towards the brake position 330. In one embodiment the biasing member 300 is a torsion spring positioned in axial alignment with the cam brake 250 between the elongated angle members 230 and the pivotally attached cam brake 250.

Additionally, a lever 270 is pivotally attached to the second end 320 of the cam brake 250 opposite from the engagement profile 260. The lever 270 extends along a plane that is generally parallel to the cam brake 250. A flange 280 protrudes from the lever 270 to attach to the tension line 160, and a kickstand 290 extends along the lever 270 opposite from the flange 280. The kickstand 290 pivots relative to the cam brake 250 and remains generally parallel therefrom. The kickstand 290 is configured to operatively engage a roller bar 350 extending between two elongated angle members 230 and adjacent to the cam brake 250. When engaged to the roller bar 350, the kickstand 290 of the lever 270 positions the cam brake 250 in the free position 340 to allow breech loading of the plurality of stackable tubes 130. The kickstand 290 can be manually manipulated to engage the roller bar 350 by a user before a tension force is applied to the lever 270 or before the tension line 160 is attached to the flange 280. In this regard, the biasing force of the biasing member 300 is overcome by the placement of the kickstand 290 on the roller bar 350. This allows clearance between the carriage assembly 190 and the plurality of stackable tubes 130 for movement therein. The kickstand 290 and the roller bar 350 become disengaged when the tension force is applied to the tension line as it is attached to the flange 280 of the lever 270. Generally, operation of the winch mechanism applies the tension force needed to both disengage the kickstand from the roller bar 350 and to translate the carriage assembly along the plurality of stackable tubes 130.

Figure 3:
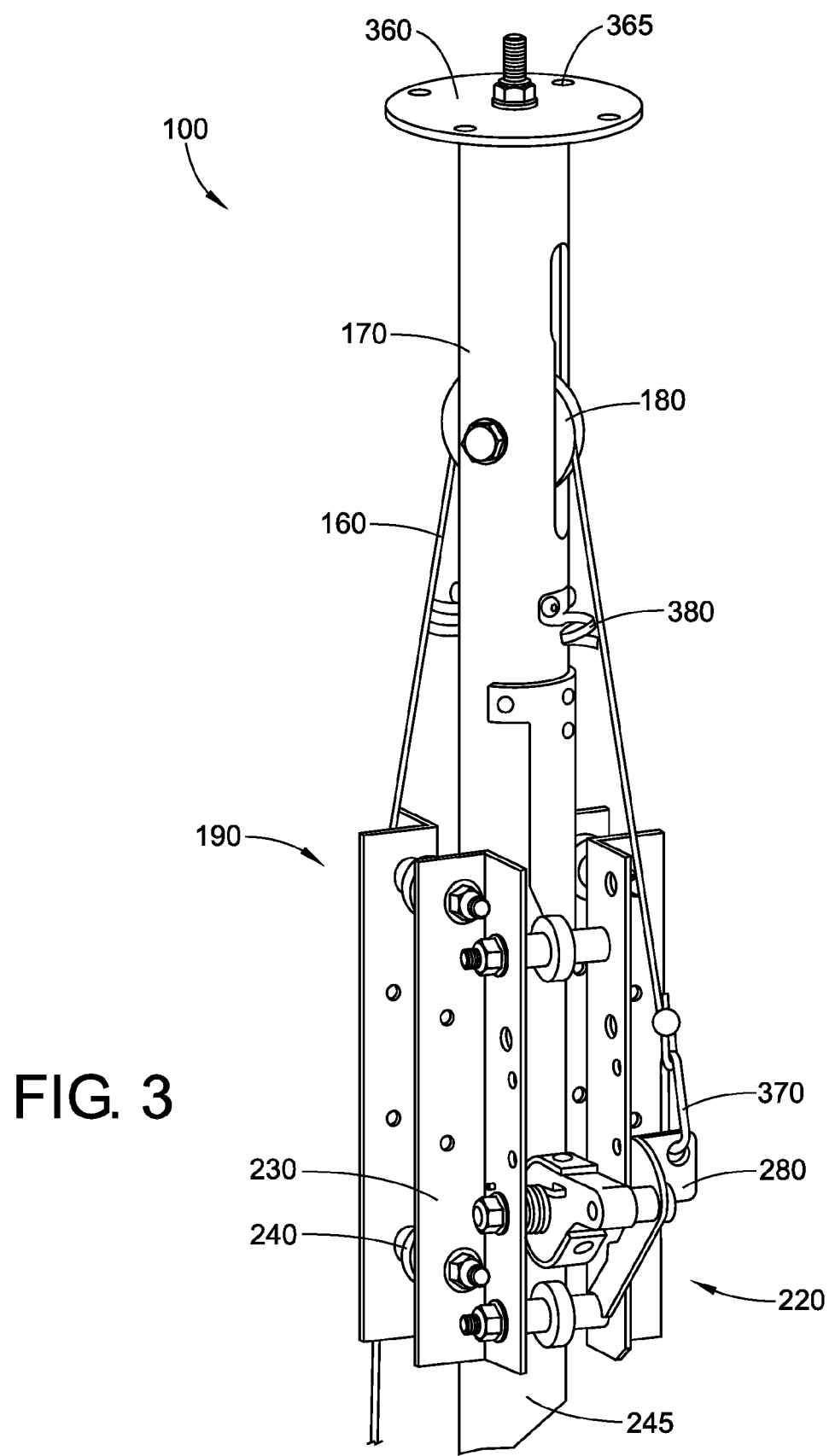
FIG. 3 is a fragmentary perspective view of the mast assembly with the carriage assembly and the safety restraint mechanism in a free position in accordance with FIG. 1.

FIG. 3 illustrates the carriage assembly 190 about the top tube 170 along the plurality of stackable tubes 130. The top tube 170 can include a guying plate 360 having a plurality of holes 365 to attach guy wire (not shown). Notably, guy wire can be attached to the guying plate 360 on the top tube 170 and staked or otherwise positioned to the ground to assist with the tube breeching/erection process and to provide additional stability to the mast assembly 100 as the carriage assembly 190 is translated thereon. A plurality of pigtail guides 380 are optionally provided along the top tube 170 to guide the tension line about the pulley 180 between the winch mechanism 150 and the flange 280 of the lever 270. The pigtail guides 380 can reduce the risk of contact of the tension line 160 with obstructions such as the first and second arms 200, 210.

As illustrated by FIGS. 3-7, the tension line 160 is attached to the flange 280 of the lever 270 by a carabineer 370. However, other conventional fasteners can also be used to attach the tension line 160 to the flange 280. Shown in FIG. 3, the tension line 160 is routed over the pulley 180 within the top tube 170 and operably attached to the winch mechanism 150. As a user operates the winch mechanism 150, tension is applied to the tension line 160 and transferred to the lever 270 and cam brake 250. As tension is applied to the tension line 160, the biasing force applied by the biasing member 300 is overcome thereby placing the cam brake 250 in the free position 340.

FIGS. 4 and 5 illustrate the cam brake 250 in the free position 340. The engagement profile 260 at the first end 310 of the cam brake 250 includes a bulbous shape that can frictionally engage the outer surface 245 of the tubes 130. The cam brake 250 relies on its oblong figure together with the biasing member 300 to toggle between engagement and disengagement with the outer surface 245. Notably, in the free position 340, the engagement profile 260 is positioned such that the relief or thin portion 275 of the first end 310 is spaced from the outer surface 245 allowing the carriage assembly 190 to translate upwards or downwards along the stackable tubes 130.

As shown in FIG. 5, the kickstand 290 is manually placed against the roller bar 350 by the user thereby holding the lever 270 and the cam brake 250 in the free position 340. The kickstand 290 remains engaged to the roller bar 350 as long as the biasing force applied by the biasing member 300 is greater than the tension force, if any, applied by the tension line 160. When the tension line 160 applies a sufficient tension force to the lever 270 to overcome the biasing force, the kickstand 290 disengages from the roller bar 350 while the cam brake 250 is maintained in the free position 340. Manipulation of the winch mechanism 150 causes translation of the carriage assembly 190 to occur. The carriage assembly 190 can also be statically maintained in a desired position along the plurality of stackable tubes 130 while the kickstand 290 is disengaged from the roller bar 350.

Figure 6:
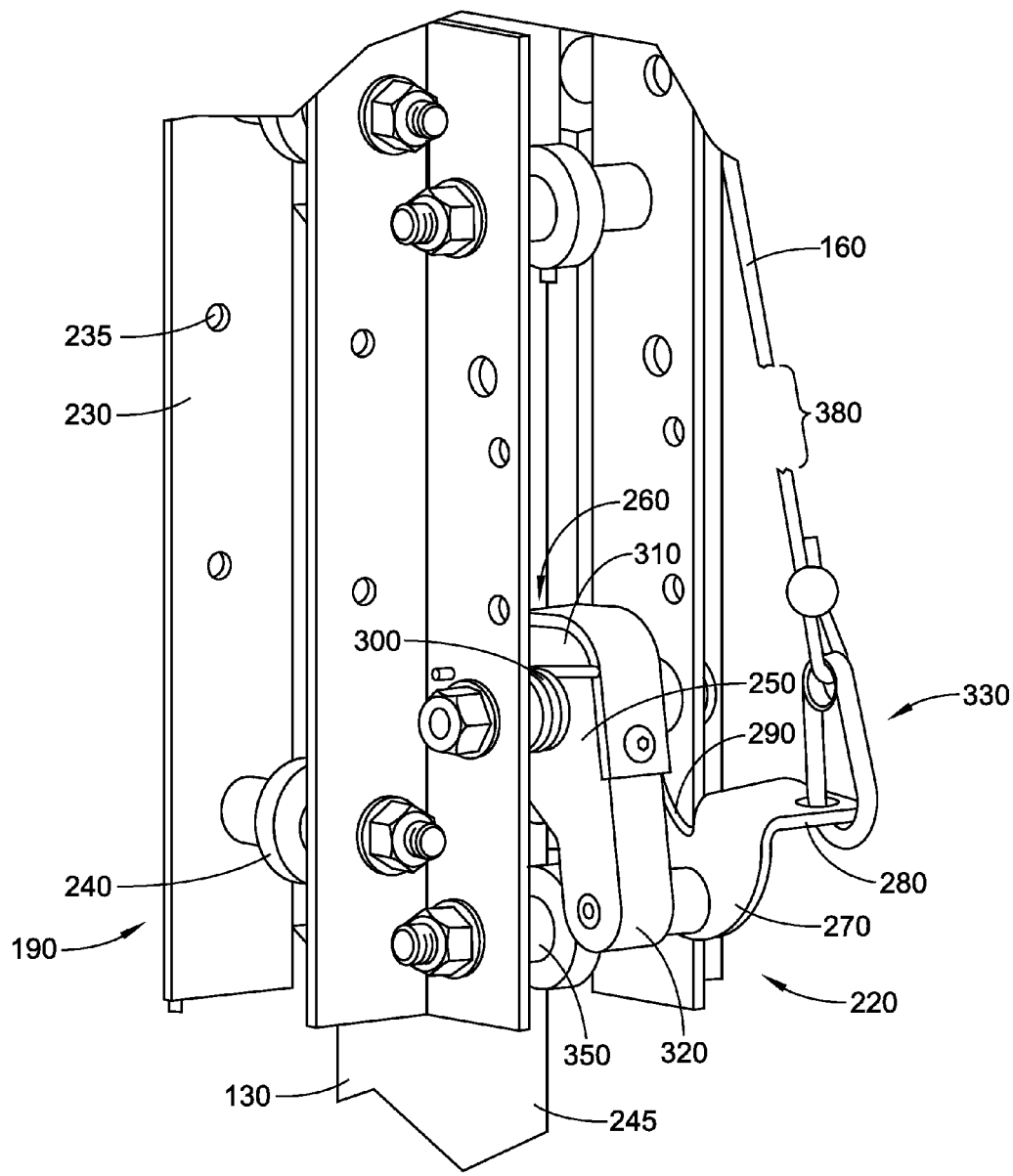
FIG. 6 is a fragmentary perspective view of the mast assembly with the carriage assembly and the safety restraint mechanism in a brake position.
Figure 7:
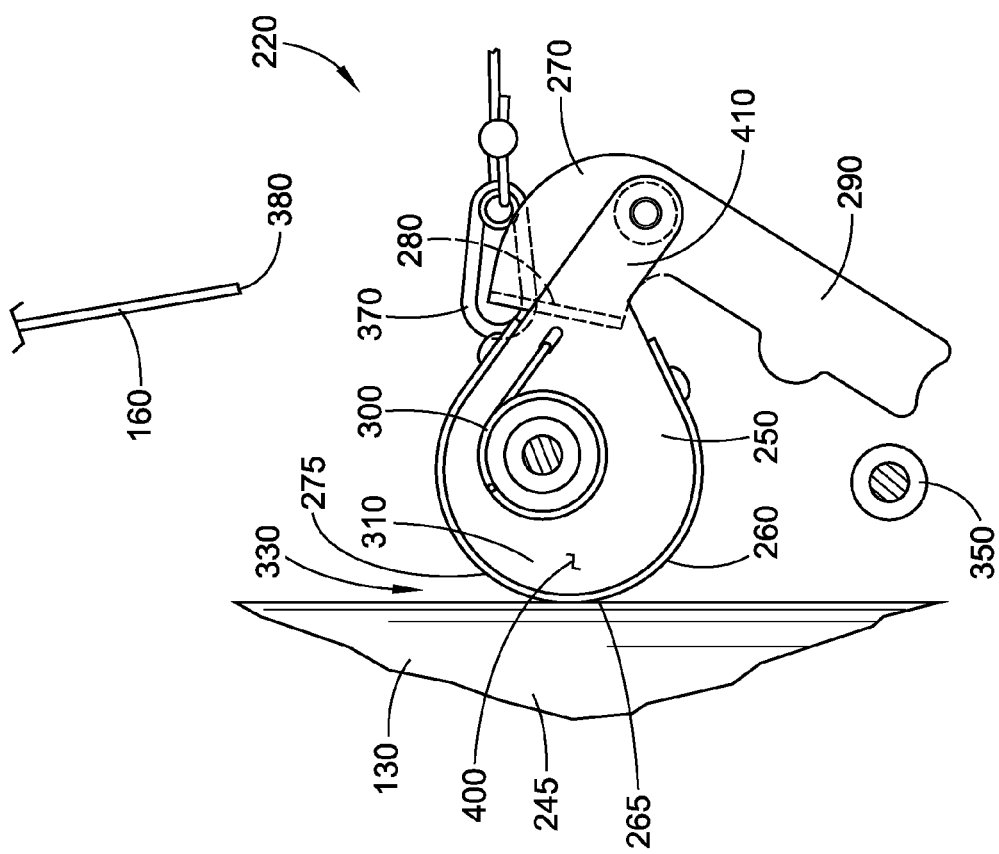
FIG. 7 is a fragmentary cross sectional view of the carriage assembly with the safety restraint mechanism in the brake position in accordance with FIG. 6.

FIGS. 6 and 7 illustrate the position of the cam brake 250 and the lever 270 when the tension line experiences failure thereby placing the cam brake 250 in the brake position 330. Notably, a break 380 or other failure may occur at some point along the tension line 160, thereby reducing the tension force acting on the lever 270. In that case, the biasing member 300 urges the cam brake 250 to pivot into the brake position 330. The protruded or thick portion 265 of the engagement profile 260 along the first end 310 of the cam brake 250 pivots relative to the carriage assembly 190 and frictionally engages the outer surface 245 of the plurality of stackable tubes 130. Additionally, in the preferred embodiment, the biasing member 300 urges the cam brake 250 with a biasing force that is sufficient to pivot the lever 270 and kickstand 290 such that the kickstand 290 avoids engagement with the roller bar 350.

As illustrated by FIGS. 4, 5 and 7, the cam brake 250 is pivotally attached to the carriage assembly by an elongated bar 390. The bar 390 extends through the cam brake 250 between the first end and the second end through the bulbous portion and maintains a generally perpendicular orientation and rotatably attaches to the elongated angles 230 of the carriage assembly 190. The bar 390 allows rotation of the barn brake 250 relative to the carriage assembly 190 and is positioned in a non-concentric manner relative to the engagement profile 260. The location of the bar 390 extending through the cam brake determines the perimeter geometry of the engagement profile 260 and the positions of the protruded and relief portions 265, 275 thereon.

Additionally, in one embodiment, the torsion spring 300 can be concentrically positioned around the bar 390 such that one end of the torsion spring is attached to the carriage assembly 290 and the opposite end is attached to the cam brake 250 to continuously urge the cam brake 250 towards the brake position 330.

In one embodiment, the cam brake 250 includes a nonlinear or oblong bulbous portion 400 adjacent the first end 310. The perimeter of bulbous portion 400 is the engagement profile 260. Optionally, the engagement profile can comprise an elongated friction material such as a friction pad. Further, an arm member 410 is adjacent the second end 320 and projects in a generally tangential manner from the bulbous portion 400. The arm member 410 is attached to the lever 270 at the second end 320.

Stated another way, provided is a safety restraint system for a payload elevation carriage such that the payload remains elevated in the event that the winch cable breaks or loses tension. To accomplish this, the cam brake element is added to the carriage.

The cam brake has a perimeter profile that is configured such that there is no contact between the cam brake and the tube under normal operating conditions. The cam brake is spring loaded with the torsion spring to bias the cam to the braked position. A linkage/lever is attached to the cam and provides a mounting point for the tension line or cable to attach. Subsequent tension on the cable overcomes the torsion spring and disengages the cam brake from the outer surface of the tube. Alternatively, when the cable loses tension or is cut, the torsion spring rotates the cam brake to contact the tube. The cam then engages the tube to act as a break and stop downward motion automatically. The cam is optionally equipped with an elastomer surface to aid the brake mechanism in conforming to the tube profile and provide better grip under all weather conditions.

In order to perform the initial breech loading, the tubes can be loaded through the tripod base, carriage and break mechanism without tension on the cable. The torsion spring would tend to position the cam brake to contact the tubes. This would impede the breech loading process making it more difficult to deploy the mast. In order to keep the cam brake from contacting the tubes during breech loading (prior to tensioning the winch cable), the kickstand linkage is incorporated to keep the cam brake from contact the tubes during deployment. The kickstand is manually employed by the user to engage the carriage to maintain space between the cam brake and the tubes as they are being stacked. Applying tension to the cable and lifting the payload automatically disengages the kickstand and positions the cam to be free to operate if needed. The user is prevented from engaging the kickstand mechanism to disable the safety break once the payload is lifted.

Once the mast is deployed and the payload is attached to the carriage assembly, the user can begin cranking the winch to lift the carriage to the desired height to position the payload. The tension on the cable lifts the cam brake off the tubes and allows free motion in the up or down direction. In the event that the cable is cut or loses tension in the winch mechanism, the cam brake automatically rotates to frictionally engage the tubes and prevent the payload from freefalling. Once the payload has been stopped, the operator can either bring the payload down by unloading tubes from the mast or by reapplying tension to the winch cable if it is possible to do so.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A safety restraint mechanism for an associated mast assembly, the safety restraint mechanism comprising:
   a carriage assembly adapted to support an associated payload and configured to move axially along the mast assembly;
   an elongated line attached to a lever at a first end and attached to an associated winch mechanism at a second end such that operation of the associated winch mechanism retracts or extends the elongated line;
   a cam brake having an engagement profile at a first end and pivotally attached to the lever at a second end, the cam brake being pivotally attached to the carriage assembly such that the engagement profile pivots to a brake position or a free position relative to a tension force acting on a tension line.

2. The safety restraint mechanism according to claim 1 further comprising a biasing member adapted to urge the cam brake towards the engaged position.

3. The safety restraint mechanism according to claim 1 wherein the lever includes a kickstand member adapted to selectively engage the carriage assembly such that the cam brake and engagement profile are in the free position.

4. The safety restraint mechanism according to claim 1 wherein the engagement profile is adapted to pivot to the brake position as the tension force acting on the tension line is removed.

5. The safety restraint mechanism according to claim 1 wherein the engagement profile is adapted to pivot to the free lift position as the tension force acting on the tension line is applied.

6. A safety restraint mechanism for a carriage assembly configured to move axially along an associated mast assembly, the safety restraint mechanism comprising:
   a lever configured to be attached to a tension line;
   a cam brake having an first end and an oppositely disposed second end, the first end having an engagement profile and is pivotally attached to the carriage assembly, the lever including a kickstand and being pivotally attached to the second end,
   the engagement profile including a protruded portion configured to abut the associated mast assembly in a brake position and a relief portion configured to disengage the associated mast assembly in a free lift position.

7. The safety restraint mechanism according to claim 6 wherein the engagement profile is non-linear.

8. The safety restraint mechanism according to claim 7 wherein the protruded portion is adjacent to the relief portion.

9. The safety restraint mechanism according to claim 6 wherein the lever includes a kickstand adapted to engage a portion of the carrier assembly to selectively place the cam brake in the free lift position or the brake position.

10. The safety restraint mechanism according to claim 6 further comprising a biasing member configured to engage the carriage assembly and the cam brake to urge the cam brake towards the brake position.

11. The safety restraint mechanism according to claim 10 wherein the biasing member is a torsion spring.

* * * * *